United States Patent
Baldwin

(10) Patent No.: US 9,313,646 B2
(45) Date of Patent: Apr. 12, 2016

(54) METHOD AND APPARATUS FOR ADJUSTING DEVICE PERSONA

(71) Applicant: AT&T Intellectual Property I, LP, Atlanta, GA (US)

(72) Inventor: Christopher Baldwin, Algonquin, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 170 days.

(21) Appl. No.: 14/056,088

(22) Filed: Oct. 17, 2013

(65) Prior Publication Data

US 2015/0111607 A1    Apr. 23, 2015

(51) Int. Cl.
| | | |
|---|---|---|
| H04B 7/00 | (2006.01) | |
| H04W 8/18 | (2009.01) | |
| H04W 4/02 | (2009.01) | |
| H04W 8/22 | (2009.01) | |

(52) U.S. Cl.
CPC ........ *H04W 8/18* (2013.01); *H04W 4/02* (2013.01); *H04W 8/22* (2013.01)

(58) Field of Classification Search
CPC ............................... H04W 8/18; H04W 24/08
See application file for complete search history.

(56) References Cited

U.S. PATENT DOCUMENTS

| | | | |
|---|---|---|---|
| 6,032,129 A | 2/2000 | Greef et al. | |
| 6,035,283 A | 3/2000 | Rofrano | |
| 6,244,873 B1 | 6/2001 | Hill et al. | |
| 6,606,744 B1 | 8/2003 | Mikurak | |
| 6,735,632 B1 | 5/2004 | Kiraly et al. | |
| 7,596,269 B2 | 9/2009 | King et al. | |
| 7,613,692 B2 | 11/2009 | Hamilton et al. | |
| 7,725,419 B2 | 5/2010 | Lee et al. | |
| 7,814,041 B2 | 10/2010 | Caporale et al. | |
| 8,037,150 B2 | 10/2011 | Weaver et al. | |
| 8,063,905 B2 | 11/2011 | Brown et al. | |
| 8,078,698 B2 | 12/2011 | Moore | |
| 8,156,060 B2 | 4/2012 | Borzestowski et al. | |
| 8,469,713 B2 | 6/2013 | Kron et al. | |
| 8,498,628 B2 | 7/2013 | Shapiro et al. | |
| 2001/0032140 A1 | 10/2001 | Hoffman | |

(Continued)

FOREIGN PATENT DOCUMENTS

| | | |
|---|---|---|
| EP | 2207164 A2 | 7/2010 |
| WO | 9957900 | 11/1999 |
| WO | 2012052582 A2 | 4/2012 |

OTHER PUBLICATIONS

Good, Nathaniel et al., "Combining Collaborative Filtering with Personal Agents for Better Recommendations", AAAI, 1999.

(Continued)

*Primary Examiner* — Wesley Kim
*Assistant Examiner* — Richard Chan
(74) *Attorney, Agent, or Firm* — Guntin & Gust, PLC; Andrew Gust

(57) ABSTRACT

A system that incorporates the subject disclosure may obtain presence information associated with a plurality of communication devices of a user, obtain operational capability information and usage profiles for the plurality of communication devices, obtain state information for each of the plurality of communication devices, and adjust a first device persona of a first communication device based on the presence information, the operational capability information, the usage profiles, and the state information. Other embodiments are disclosed.

20 Claims, 6 Drawing Sheets

(56) References Cited

U.S. PATENT DOCUMENTS

| | | |
|---|---|---|
| 2002/0054750 A1 | 5/2002 | Ficco |
| 2003/0028498 A1 | 2/2003 | Hayes-Roth |
| 2005/0060532 A1 | 3/2005 | Dorenbosch et al. |
| 2008/0244040 A1* | 10/2008 | Bhatia et al. ............ 709/219 |
| 2009/0299932 A1 | 12/2009 | Hodge et al. |
| 2010/0028846 A1 | 2/2010 | Cohen et al. |
| 2010/0100907 A1 | 4/2010 | Chang et al. |
| 2010/0100916 A1 | 4/2010 | Clayton et al. |
| 2010/0281427 A1 | 11/2010 | Ghosh et al. |
| 2011/0078578 A1 | 3/2011 | Calis |
| 2011/0093598 A1 | 4/2011 | Baratz et al. |
| 2011/0125770 A1 | 5/2011 | Battestini et al. |
| 2012/0054333 A1* | 3/2012 | Vichare et al. ............ 709/224 |
| 2013/0013727 A1 | 1/2013 | Walker |
| 2013/0054701 A1 | 2/2013 | Leeder et al. |
| 2013/0151602 A1 | 6/2013 | McClelland et al. |
| 2013/0162677 A1 | 6/2013 | Maaradji et al. |
| 2013/0167196 A1* | 6/2013 | Spencer et al. ............ 726/3 |
| 2013/0185412 A1 | 7/2013 | Orr et al. |
| 2013/0185442 A1 | 7/2013 | Siegel et al. |
| 2013/0191213 A1 | 7/2013 | Beck et al. |
| 2013/0198374 A1* | 8/2013 | Zalmanovitch et al. ...... 709/224 |

OTHER PUBLICATIONS

Lieberman, H. et al., "Instructible agents: Software that just keeps getting better", IBM Systems Journal, vol. 35, Nos. 3 & 4, 1996, 539-556.

Lieberman, H., "Out of context: Computer systems that adapt to, and learn from, context", IBM Systems Journal, 2000, 617-632.

Maes, Pattie, "Agents that Reduce Work and Information Overload", MIT Media Laboratory, 1994, 1-17.

Mitchell, Tom et al., "Experience With a Learning Personal Assistant", ACM, 1994, 1-18.

\* cited by examiner

300

METHOD AND APPARATUS FOR ADJUSTING DEVICE PERSONA

FIELD OF THE DISCLOSURE

The subject disclosure relates to a method and apparatus for adjusting a device persona.

BACKGROUND

Users often have multiple communication devices with overlapping capabilities. These capabilities are not always the same, such as different formatting, different communication protocols, different resolution, different display size and so forth. User preferences can sometimes dictate which device to utilize for a particular media service. However, other factors may also exist which are not accounted for by a pre-defined user preference.

As the number of devices of a user grows, the number of choices for the user with respect to utilizing the device also grows. The interaction between these devices becomes more complex.

BRIEF DESCRIPTION OF THE DRAWINGS

Reference will now be made to the accompanying drawings, which are not necessarily drawn to scale, and wherein.

DETAILED DESCRIPTION

Figure 1:
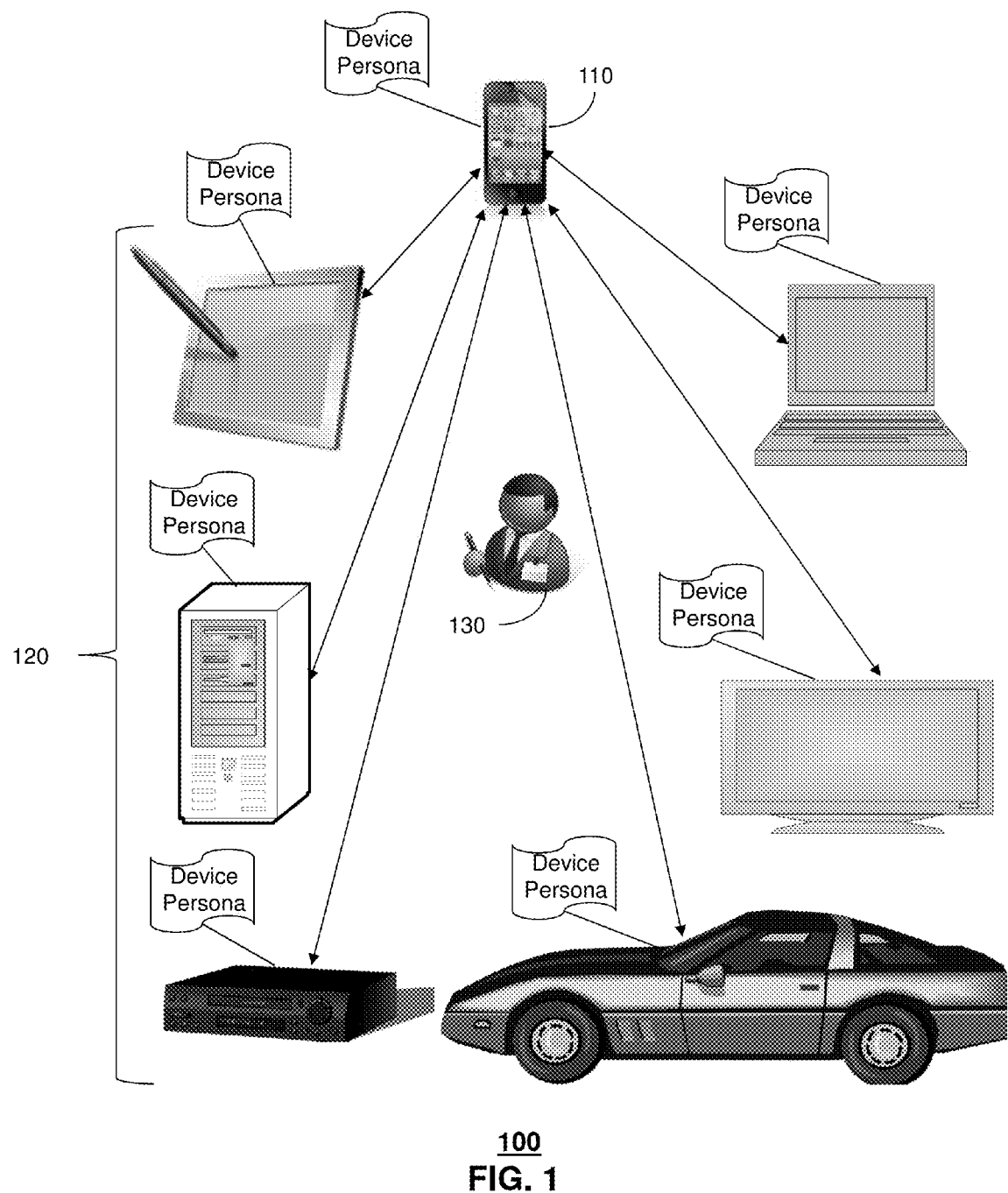
FIG. 1 depicts an illustrative embodiment of a communication system including a group of communication devices associated with a user or group of users that enables device persona adjustments.

The subject disclosure describes, among other things, illustrative embodiments for enabling one or more device personas to adapt to the presence, capabilities, state, and/or usage patterns of other end user devices. The exemplary embodiments enable device personas to adapt as other end user devices evolve or otherwise change such as through how they are being used, how their capabilities have improved or diminished, new devices that are available, user preferences and so forth.

In one embodiment, a group of communication devices associated with a user can share various information with each other or with a subset of the group, so that device personas can be collectively adjusted. In this example, functionality can be designated to preferred devices among the group based on various learned factors, such as user preferences detected via monitoring usage patterns of the group of devices. Other factors can also be utilized in identifying preferred devices amongst the group of device for performing particular functions such as identifying devices with optimum capabilities and/or resources for performing the particular function, identifying devices that are otherwise busy (e.g., engaged in an active communication session), identifying devices with limited battery power, limited storage capacity and/or limited signal strength, and so forth.

In one or more embodiments, in order for a device persona to adapt to other devices it should first be aware of the other devices and/or other personas. The identification of other devices can be accomplished in a number of different ways which may change with new technologies. In one embodiment, incorporated into persona capable devices (or stored/backed up in the cloud) can be a system for recording all other identified user devices. In another embodiment, a user can enter new devices manually or the new devices can be detected by a device using any number of methods such as wireless signals (e.g., WiFi, Bluetooth, NFC, and so forth), bone conduction, visual identification (e.g., Google glasses capturing a connected device on the user's wrist in an image or video).

In one or more embodiments, responsive to new devices having been identified, their specifications can be accessed or otherwise learned. For example, the specifications and/or capabilities of a device can be entered manually by the user. In another embodiment, the specifications and capabilities of each device can be accessed from a remote information source such as via a search on the internet based on a model of the device. In another embodiment, the device(s) can provide its device specifications and capabilities to other devices. These specifications and capabilities can be stored in the system indexed to the device identification. This can enable device personas to determine how their usage might change if one or more other devices are present. An example is where a smartphone is being used to watch a movie, but if a tablet becomes present (e.g., a user arrives home) with sufficient battery power the smartphone may no longer be the preferred device for such an activity. However, there may be situations in which a user may prefer to watch the movie on the smartphone and these situations can be accounted for via the exchange of information among the group of user devices. There may also be users that prefer watching movies on smartphones rather than tablets all of the time which is also accounted for via sharing usage data among the group of user devices including the smartphone and the tablet.

In one or more embodiments, device usage data can be shared amongst the group of user devices or amongst a subset of the group. This sharing can be performed periodically (or according to a pre-defined schedule and/or can be performed dynamically such as responsive to device usage changes that meet a certain threshold such as detecting that a smartphone has been used to watch more than one hour of a high definition movie. By sharing the usage data on a regular basis, the group of devices can track changes amongst the group and also identify new trends.

One aspect of a device persona is how the device is being used. This can be information that each device can learn over time and can then share with the other devices of the group so that individual device personas can become more customized and specific to the relationship between the user and the device(s). For instance, as one device is used it may track numerous aspects of the device experience including date, time, location, persona, application/content, and so forth. The type and quantity of information gathered by a device may only be limited by its sensors and its connections to other sensors. This data may be pooled with data from other devices to build a usage profile for each device persona. In this way each device persona for each device can learn its role and customize itself accordingly. Device personas can control or otherwise be indicative of the functions that the particular device performs, where those functions can be exclusive (e.g., a designated device for presenting high-definition movies) or can be non-exclusive (e.g., a prioritized list for establishing a video conference call where the first preferred device is a set top box, the second preferred device is a mobile phone). As device usage changes, the roles of the devices may change and this regular exchange of usage data can enable the device personas to evolve or otherwise be adjusted with the user's habits and patterns.

Another factor that can be monitored or otherwise determined in order to adjust the roles of devices among the group of devices is the current state of the devices. The state of each device may affect the device personas of the other devices. If another device is present, but is nearly out of battery charge then it is the equivalent of not being present at all. Devices may communicate a number of different aspects of their current state to other devices such as current activity, remaining charge, remaining storage space, active and inactive connections, connection bandwidth, signal strength, and so forth. The state information can be communicated frequently, such as according to a pre-defined schedule or based on a state change at a device. For instance, a state change at a device can be identified as a significant change that should be communicated to the other devices because the state change alters the ability of the particular device to perform a typical role, such as the battery power of a mobile device falling below a 20 percent threshold where the mobile device has taken on a device persona that includes the role of being a preferred device for presenting high definition movies. As the state changes (or right before they change in the case of a forced shutdown due to a loss of power), each device may provide updates to other devices so that personas may be adapted as appropriate.

The method and device(s) of the exemplary embodiments enable adaptation of individual device personas according to the presence, operational capabilities, state, usage patterns, and so forth of other devices. This enables device personas to evolve to better match the user as well as the context or circumstances. Device personas can be adjusted individually by the device itself and/or can be adjusted based on a master/slave relationship such as having a primary device (e.g., a mobile device) which can determine its own device persona as well as the device person for one or more of the other user devices. In the exemplary embodiments, device personas can behave collaboratively like members of a small community. They are each a distinct entity, but can also all be thought of as a single entity for purposes of delivering media services to a user.

Other embodiments are included in the subject disclosure.

One embodiment of the subject disclosure is a method that includes obtaining, by a first communication device including a processor, presence information associated with a plurality of communication devices, where the first communication device and the plurality of communication devices are associated with a user. The method can include obtaining, by the first communication device, operational capability information for the plurality of communication devices. The method can include generating, by the first communication device, a first usage profile for the first communication device based on monitoring first activity at the first communication device, where the first activity being monitored includes first media consumption and first communication sessions, and where the monitoring of the first activity includes identifying time and location data for the first activity. The method can include obtaining, by the first communication device, other usage profiles for the plurality of communication devices, where each other usage profile is generated by one communication device of the plurality of communication devices based on monitoring other activity at the one communication device, where the other activity being monitored includes other media consumption and other communication sessions, and wherein the monitoring of the other activity includes identifying time and location data for the other activity. The method can include obtaining, by the first communication device, state information for each of the plurality of communication devices. The method can include adjusting, by the first communication device, a first device persona of the first communication device based on the presence information, the operational capability information, the other usage profiles, and the state information, where the first device persona controls functions performed by the first communication device. The method can include transmitting the first usage profile from the first communication device to the plurality of communication devices.

One embodiment of the subject disclosure includes a communication device including a memory to store executable instructions, and a processor coupled with the memory, where the processor, responsive to executing the executable instructions, performs operations that include obtaining presence information associated with a plurality of communication devices, where the communication device and the plurality of communication devices are among a group of devices associated with a user. The processor can obtain operational capability information for the plurality of communication devices, and can generate a first usage profile for the communication device based on monitoring first activity at the communication device, where the first activity being monitored includes first media consumption and first communication sessions, and where the monitoring of the first activity includes identifying time and location data for the first activity. The processor can obtain other usage profiles for each of the plurality of communication devices, where the other usage profiles are generated by a corresponding one of the plurality of communication devices based on monitoring other activity at the corresponding one of the plurality of communication devices, where the other activity being monitored includes other media consumption and other communication sessions, and where the monitoring of the other activity includes identifying time and location data for the other activity. The processor can obtain state information for each of the plurality of communication devices, wherein the state information includes current power information and active communication session information. The processor can adjust a device preference among the group of devices for presenting media services based on the presence information, the operational capability information, the other usage profiles, and the state information.

One embodiment of the subject disclosure includes a computer-readable storage device comprising computer instructions which, responsive to being executed by a processor of a first communication device, cause the processor to perform operations including obtaining presence information associated with a plurality of communication devices, where the first communication device and the plurality of communication devices are associated with a user. The processor can obtain operational capability information for the plurality of communication devices, where the operational capability information includes media service capabilities and formatting capabilities. The processor can obtain usage profiles for the plurality of communication devices, where each of the usage profiles is generated by one communication device of the plurality of communication devices based on monitoring activity at the one communication device, where the activity being monitored includes media consumption and communication sessions. The processor can obtain state information for each of the plurality of communication devices, where the state information includes current power information. The processor can adjust a first device persona of the first communication device based on the presence information, the operational capability information, the usage profiles, and the state information, where the first device persona controls functions performed by the first communication device.

FIG. 1 depicts an illustrative embodiment of a communication system 100 that includes a communication device 110 and a plurality of other communication devices 120. Various other devices that facilitate or otherwise may enable communication between the devices 110, 120 are not shown, but one of ordinary skill in the art would understand that other components, including network elements (e.g., routers, switches, servers, wireless access points, base stations, femtocells and so forth) and customer premises equipment (e.g., gateways, modems, and so forth) can be used in system 100. The device 110 and other devices 120 can be associated with a user 130 (or a group of users). The user association can be in various forms such as a registered owner of the device, a registered user of the device, a guest user of the device and so forth. The devices 110, 120 can be various types of devices including one or more of mobile devices, laptop computers, desktop computers, tablets, media processors (e.g., a set top box), interactive televisions with internet capabilities, vehicle communication systems, and so forth. It should be understood that device 110, and devices 120 can be any types of communication devices, although for purposes of the examples described herein, device 110 will be described as a mobile device.

Each of the devices 110, 120 can have a device persona which is indicative of the functions that the device performs within the group of user devices. These functions can be exclusive, such as the interactive television device 120 being designated for presenting high-definition movies, or can be non-exclusive, such as both the mobile device 110 and the vehicle communication device 120 being designated for receiving incoming telephone calls. In one or more embodiment, the device persona can be the policies or rules of the device that control, dictate or otherwise describe performance of the functions by the device. In other embodiments, the device persona can be the role that the particular device has taken among the group of devices in performing exclusive or non-exclusive media service functions.

In one embodiment of system 100, presence information, operational capability information, usage profiles and/or state information can be shared among a group of user devices (devices 110, 120) or a subset of the group. The usage profiles can be generated by each of the communication devices 110, 120 locally based on monitoring its own activity. The activity being monitored can include media consumption and/or communication sessions. The monitoring of the activity can include identifying time and/or location data for the activity. The state information can include current power information and/or active communication session information. System 100 enables or otherwise facilitates adjustment of device preference(s) among the group of devices 110, 120 for presenting or providing media services based on the presence information, the operational capability information, the other usage profiles, and/or the state information. This can be accomplished via the adjustment of device personas for the devices. In one embodiment, the operational capability information can include media service capabilities and/or formatting capabilities.

In one embodiment, a first usage profile can be transmitted from the communication device 110 to a second communication device of the plurality of communication devices 120 to enable the second communication device to adjust a device persona for the second communication device, where the device persona controls functions performed by the second communication device. In one embodiment, the device 110 can generate a device persona based on the presence information, the operational capability information, the usage profiles, and/or the state information, where the device persona controls functions performed by a second communication device of the plurality of communication devices 120, and transmitting the device persona from the first communication device to the second communication device. In one embodiment, the functions controlled by the device persona can include being selected as a preferred device for presentation of media services. In one embodiment, the state information can include current storage capacity information, current signal strength, and/or inactive connections.

Figure 2:
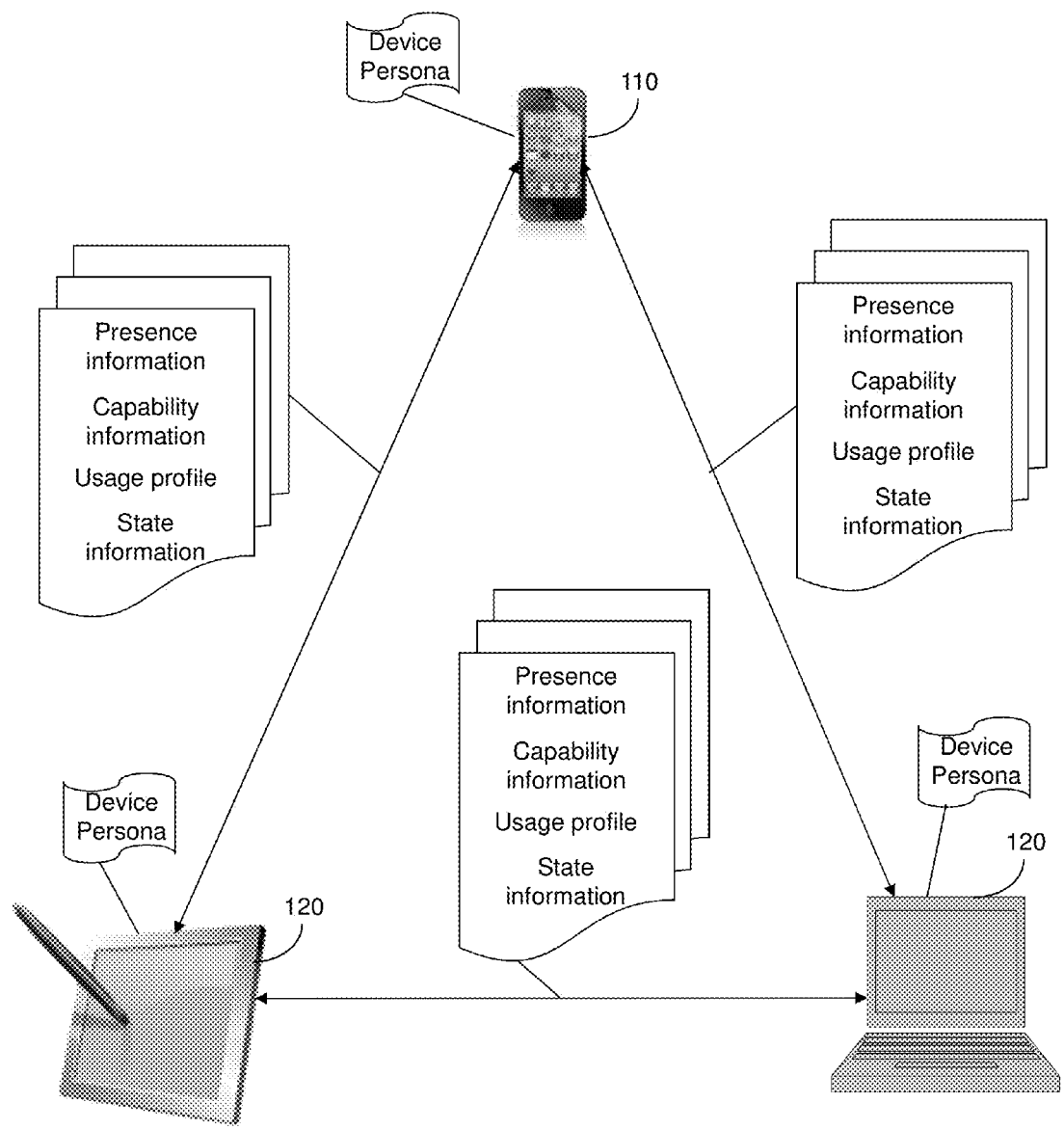
FIG. 2 depicts an illustrative embodiment of another communication system including a group of communication devices that enable device persona adjustment.

FIG. 2 depicts an illustrative embodiment of a communication system 200 that includes device 110 and a plurality of communication devices 120. Device 110 and devices 120 can be any type of customer premises equipment including end user devices. While two devices 120 are illustrated, it should be understood that any number of user devices can be included in a group of devices associated with a user or group of users. Various other devices that facilitate or otherwise may enable communication between the devices 110, 120 are not shown, but one of ordinary skill in the art would understand that other components, including network elements (e.g., routers, switches, servers, wireless access points, base stations, femtocells and so forth) and customer premises equipment (e.g., gateways, modems, and so forth) can be used in system 200.

In one embodiment of system 200, device 110 can obtain presence information, operational capability information, usage profiles and/or state information associated with the devices 120. The usage profiles can be generated by each of the communication devices 120 based on monitoring activity at the particular device. The activity being monitored can include media consumption and/or communication sessions. The monitoring of the activity can include identifying time and location data for the activity. System 200 enables or facilitates adjusting of one or more device personas based on the presence information, the operational capability information, the other usage profiles, and/or the state information. The device persona(s) can control or otherwise describe functions performed by the devices 110 and/or 120.

In one embodiment, the operational capability information can include media service capabilities and/or formatting capabilities. In one embodiment, the state information can include current power information, current storage capacity information, active communication session information and/or current signal strength. In one embodiment, the device 110 can transmit its usage profile to one or more of the plurality of communication devices 120 to enable or otherwise facilitate the communication device(s) 120 to adjust its corresponding device persona, where the corresponding device persona controls or otherwise describes functions performed by that communication device. In one embodiment, the functions controlled by the device persona(s) include being selected as a preferred device (exclusively or non-exclusively) for presentation of media services.

In one embodiment, the device 110 can generate a second device persona based on the presence information, the operational capability information, the usage profiles, and/or the state information, where the second device persona controls functions performed by a second communication device of the plurality of communication devices 120, and can transmit the second device persona from the device 110 to the second communication device 120. In one embodiment, the functions controlled by the second device persona can include being selected as a preferred device for presentation of media services, wherein the device 110 is not selected as the preferred device. In one embodiment, the obtaining of the presence information associated with the plurality of communication devices 120 can include capturing an image, analyzing the image utilizing pattern recognition to identify a second communication device, and determining that the second communication device is among the plurality of communication devices associated with the user.

In one embodiment, the device 110 can receive updated state information from a second communication device of the plurality of communication devices 120, where the updated state information is received in response to a forced shutdown at the second communication device. In one embodiment, the device 110 can identify a conflicting function in a first device persona and in a second device persona of different devices, and can communicate with the second communication device to resolve the conflicting function between the first and second device persona so that one of the devices 110, 120 is designated to perform the conflicting function. In one embodiment, the first device persona and the corresponding device persona collectively provide a prioritized list of preferred devices for providing media services to the user.

The sharing of information between the devices in system 200 can be triggered based on various events. For example a schedule, such as a periodic, can be utilized for transmitting information between devices. In another embodiment, a triggering event can be detected and can cause the transmission of the information. For instance, a remaining power threshold or remaining storage capacity threshold can be used for triggering the transmission of a change of state for a device. Different schedules and/or triggering events can be used for different types of information. For instance, presence information can be exchanged every time there is a detection of a change to presence of a device while usage profiles can be shared based on a periodic schedule. In one embodiment, a combination of periodic information exchange and triggering event exchange can be utilized. For example, usage profiles can be exchanged based on a pre-defined schedule and additional usage profiles can be transmitted by a particular device if the device detects that a usage threshold has been met such as transmitting an additional usage profile indicating that the particular device has been utilized for presenting high-definition movies for more than ten hours in a week. Some of the information exchange may utilize an exchange schedule that is more frequent than others, such as frequently exchanging state information but infrequently exchanging capability information.

System 200 illustrates an exchange of information between all of the devices 110, 120. However, various data flow paths can be utilized in exchanging information. For example, if device 110 is utilized as a master device for generating and configuring all of the device personas then all of the information can be transmitted from devices 120 to device 110 without devices 120 exchanging information with each other. In another embodiment, a subset of the devices can receive the information. In another embodiment, routing for information exchange can be dynamic. For example, all of the information can be sent to each device while each device is enabled with the capability to determine its own device persona but when that capability is withdrawn (e.g., the device is switched to a slave device that receives its device persona from another device) then the slave device no longer receives the information.

Figure 3:
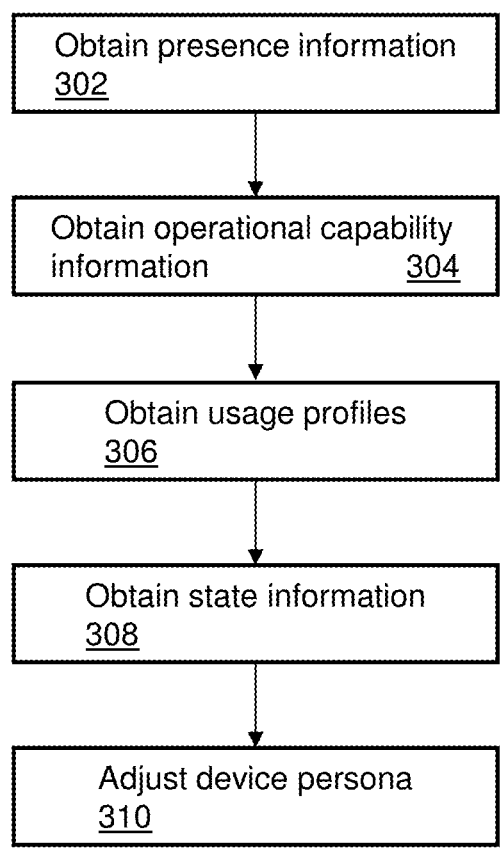
FIG. 3 depicts an illustrative embodiment of a method for device persona adjustment operating in portions of the system described in FIGS. 1 and 2.

FIG. 3 depicts an illustrative embodiment of a method 300 that can be used by one or more of devices 110, 120 of FIGS. 1 and 2. Method 300 can begin at 302 where presence information associated with communication devices of a user is obtained or otherwise shared. The presence information can be provided to all of the user communication devices or to one or more designated user devices (e.g., a master user device). In this example, the user devices are associated with a user or group of users, such as the first communication device 110 and the plurality of communication devices 120 of FIGS. 1 and 2. The presence information can be obtained in a number of different ways or combination of ways. For example, presence information can be received directly from user devices, such as intermittent presence broadcast signals. In another embodiment, a back-end server can transmit presence information to the user devices such as based on monitoring of network elements that are providing communication sessions for the user devices. In another example, the presence information can be generated based on pattern recognition being applied to captured content of one or more of the user devices. For example, a camera, such as of mobile device 110 or Google glasses, can capture an image of the user and analyze the image to detect any communication devices in proximity to the user, such as a new watch being worn by the user that includes communication capability. The analysis can be used to identify the watch and identify that the watch should be included in the group of devices that are associated with the user. In another example, the user can input information to one or more of the user devices to indicate that a new communication device can be associated with the user, such as when the user purchases a new interactive television. The user devices can also share presence information that has been received. For instance, the mobile device 110 can receive a notification from the network indicating that the vehicle communication system 120 is in proximity to the mobile device. This can cause the mobile device 110 to transmit messages to each (or a portion) of the other user devices to advise those devices of the presence of the vehicle communication system 120.

At 304, operational capability information can be obtained or otherwise shared for the plurality of communication devices. The sharing can be limited to a single device (e.g., a master device) or can be among a portion or all of the group of user devices. The operational capability information can include media services that the device can provide, formatting capabilities, compatible communication protocols, and so forth. The operational capability information can be received directly from user devices, such as the media device 110 requesting a list of capabilities from the interactive television 120 upon detecting the presence of the television. In another embodiment, a back-end server can transmit the capability information to the user devices such as based on device profiles stored in a database that are indexed to the particular user. In another example, the device capabilities can be determined based on network searches according to identification for the user device, such as a model number of the tablet 120. In another example, the user can input the capability information to one or more of the user devices to indicate that a new communication device is associated with the user, and that the new device has particular capabilities. The user devices can also share operational capability information that has been received. For instance, the mobile device 110 can receive a notification from the vehicle communication system 120 that the vehicle communication system is capable of presenting high-definition movies. This can cause the mobile device 110 to transmit messages to each (or a portion) of the other user devices to advise those devices of the capabilities of the vehicle communication system 120.

At 306, usage profiles can be obtained or otherwise shared for the plurality of communication devices. The sharing can be limited to a single device (e.g., a master device) or can be among a portion or all of the group of user devices. The usage profiles can be generated by each of the communication devices based on monitoring its own activity. The activity can be various forms such as media consumption, communication sessions, applications being executed, web surfing and so forth. The monitoring of the activity can include identifying time and location data for the activity, as well as collecting other data such as types or genre of media being presented at the device. The usage profile can include synthesizing the data to determine usage patterns for the device. For instance, the usage profile can determine a pattern of watching high-definition movies on the mobile device 110 while the mobile device is moving rapidly (determined from base station handovers) and is in proximity to the vehicle communication system 120. In one or more embodiments, the transmitting or otherwise providing of the usage profiles can be based on a schedule, such as periodic transmissions of the usage profiles among the group of devices 110, 120. In another embodiment, the transmitting or otherwise providing of the usage profiles can be based on a change in usage that satisfies a usage threshold of the device. For example, the mobile device 110 may have a history of never presenting more than 30 minutes of high definition movies per week. A threshold may be set so that if the mobile device 110 presents more than 30 minutes of high definition movies in a week then the usage pattern is distributed or otherwise shared with the other user devices. These thresholds can be established based on user preference, monitored user history, device capabilities, functions being performed by the device, and so forth.

At 308, state information can be obtained or otherwise shared for the plurality of communication devices. The sharing can be limited to a single device (e.g., a master device) or can be among a portion, or all, of the group of user devices. The state information can be various forms of information and can include current power information (e.g., remaining battery power), current storage capacity information (e.g., remaining usable memory), active communication session information (e.g., wireless and/or wired ongoing communication sessions), inactive connections, current signal strength, connection bandwidth, and so forth. In one or more embodiments, the transmitting or otherwise providing of the state information can be based on a schedule, such as periodic transmissions of state information among the group of devices 110, 120. In another embodiment, the transmitting or otherwise providing of the state information can be based on a change of state at one of the devices. For instance, the mobile device 110 may cross the threshold of 20 percent remaining battery which triggers a sharing of state information by the mobile device to the other devices via a wireless transmission from the mobile device to the other devices. The triggering event for the sharing of the state information can vary and can be based on thresholds which can vary depending on the particular device. For example, a mobile device 110 that has a two hour battery life may utilize a 20 percent threshold as its triggering event for sending out a change of state message while a laptop computer 120 that has a six hour battery life may utilize a 5 percent threshold as its triggering event for sending out a change of state message. These thresholds can be established based on user preference, monitored user history, device capabilities, functions being performed by the device, and so forth.

At 310, device persona(s) for one or more of the user devices can be adjusted based on the various information that has been obtained, such as the presence information, the operational capability information, the usage profiles, and/or the state information. As an example, the mobile device 110 can adjust its own device persona based on the presence information, the operational capability information, the other usage profiles, and/or the state information received from the other user devices 120, where the device persona controls functions performed by the mobile device 110. The adjustment of the device persona can be in various forms. For instance, the adjustment to the device persona can be taking on a new or modified role among the group of devices. For example, the mobile device 110 can adjust its device persona such that it becomes a preferred device among the group of devices for performing a particular media service, such as presenting high-definition movies. In this example, a previous preferred device, such as the interactive television 120 can modify its own device persona so that it is no longer the preferred device for presenting the high-definition movies. The adjustment of the device persona is not limited to distributing exclusive functions to certain devices among the group of user devices. The group of user devices can share designations as preferred devices for certain media services. For instance, the mobile device 110 and the vehicle communication system 120 can both be designated as preferred devices for receiving incoming calls. In this example, the user can then select among the two preferred devices for answering the call. In another embodiment, the media function can be split between devices. For example, the mobile device 110 can be designated as the preferred device for presenting audio content corresponding to a high definition movie while the vehicle communication system 120 is designated as the preferred device for presenting video content for the high-definition movie.

Method 300 can be performed as a distributed system whereby each of the communication devices receives the various information (e.g., presence, operational capability, usage profiles, state) from the other devices, and adjusts its own device persona. In this embodiment, conflicting functions can be generated based on the persona modifications. For instance, state information may be received indicating that the interactive television 120 has lost its wireless connection for downloading video-on-demand content. Based on this change of state for the interactive television, both the mobile device 110 and the desktop computer 120 may adjust their own device personas to be the preferred device for accessing and presenting the video-on-demand content. This conflicting function can be resolved based on communication between the mobile device 110 and the desktop computer 120. For instance, a comparison of the mobile device state information and the desktop computer state information may indicate that the mobile device has one hour of battery power left. Other factors, such as a history of the mobile device receiving incoming calls during the time period in which the video-on-demand content would be presented, may also play a factor in resolving the conflicting function. In one or more embodiments, the conflicting functions can be resolved based on user preferences between particular devices for particular functions that are designated by the user, such as a user designating that it is preferable to watch the video-on-demand content on the bigger display of the desktop computer 120 rather than the smaller display of the mobile device 110. However, there may be other instances when the user preferences are not determinative of a resolution to a conflicting function, such as where the desktop computer 120 is scheduled for a virus scan which would occur during the presentation of the video-on-demand content.

In one or more embodiments, the adjustment of the device personas can be performed in a centralized fashion, such as based on a master/slave relationship between the group of devices. As an example, the mobile device 110 can be a designated master device while the other user devices are designated slave devices. The mobile device 110 can adjust its own device persona and can also generate persona adjustments that are transmitted to the other user devices. In this example, the sharing of information can be limited to providing the presence information, operational capability information, usage profiles, and state information to the mobile device 110 so that the mobile device can determine all of the device person adjustments that are to be made. In another embodiment, the adjustments of device personas can be divided between a centralized technique and a distributed technique. For instance, designation of preferred devices for performing particular media services can be made by a single master device of the group of user devices but other adjustments to the device personas can be made by the individual devices, such as other device behavior, notification controls, call routing, GUI arrangements, and so forth.

Figure 4:
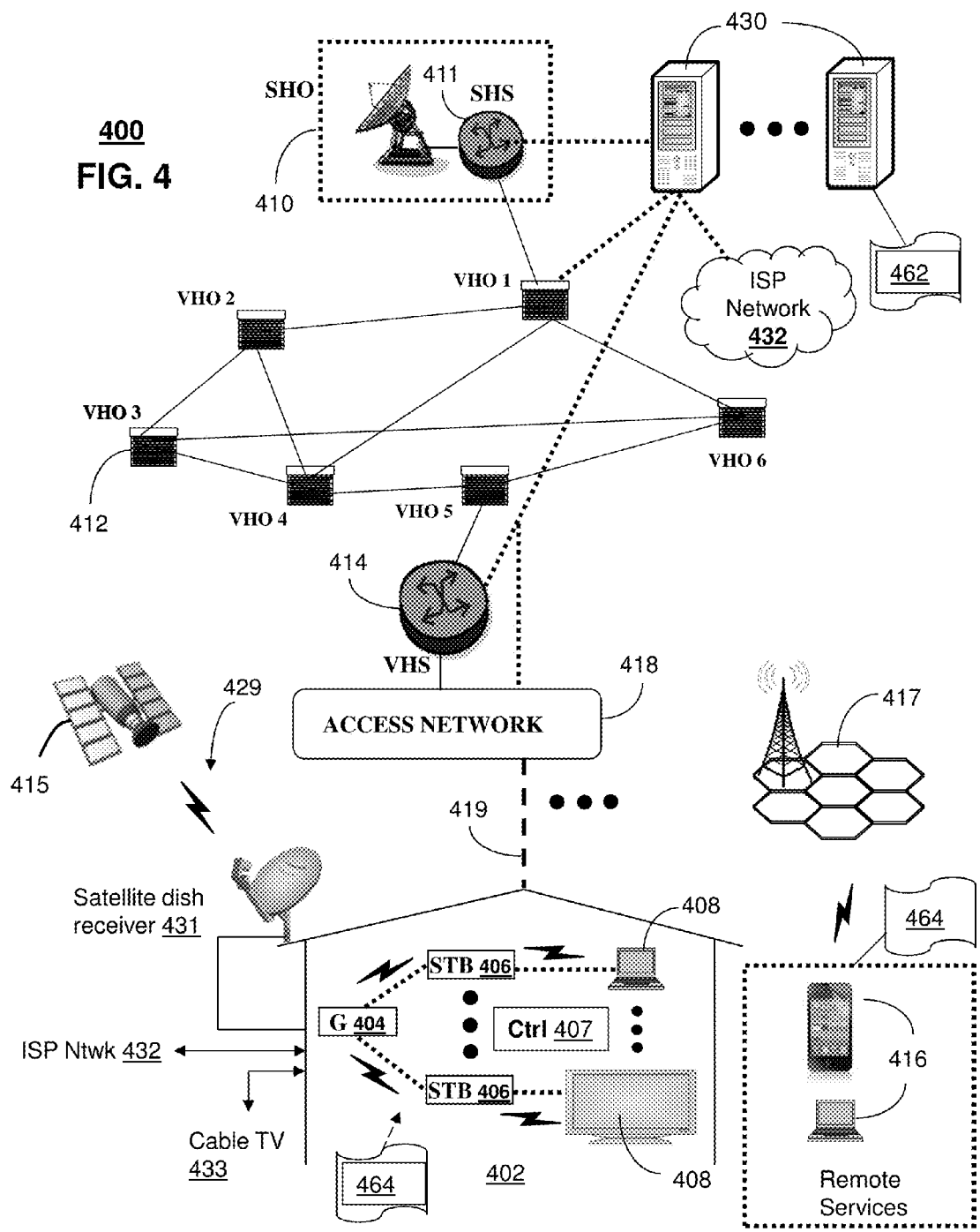
FIG. 4 depicts an illustrative embodiment of a communication system that provides media services including device persona adjustment.

FIG. 4 depicts an illustrative embodiment of a communication system 400 for delivering media content. The communication system 400 can represent an Internet Protocol Television (IPTV) media system. Communication system 400 can be overlaid or operably coupled with systems 100 and/or 200 figure of FIG. 1 and/or 2 as another representative embodiment of communication system 400.

System 400 enables one or more device personas of end user devices to adapt to the presence, capabilities, state, and/or usage patterns of other end user devices. The device personas can adapt, either at the instruction of the particular end user device or at the instruction of another device, as other end user devices evolve or otherwise change such as through how they are being used, how their capabilities have improved or diminished, new devices that are available, user preferences and so forth. System 400 enables a group of communication devices associated with a user to share various information with each other, or with a subset of the group, so that device personas can be collectively adjusted. Functionality for the end user devices can be designated to preferred devices among the group based on various learned factors, such as user preferences detected via monitoring usage patterns of the group of devices. Other factors can also be utilized in system 400 for identifying preferred devices amongst the group of device for performing particular functions such as identifying devices with optimum capabilities and/or resources for performing the particular function, identifying devices that are otherwise busy (e.g., engaged in an active communication session), identifying devices with limited battery power, limited storage capacity and/or limited signal strength, and so forth.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a persona server (herein referred to as server 430). The server 430 can use computing and communication technology to perform function 462, which can include among other things, facilitating the obtaining or distributing of presence information, operational capability information, usage profiles and/or state information for the group of user devices. The server 430 can perform some or all of the device persona adjustments described above with respect to systems 100 and 200 and method 300. For example, the server 430 can resolve a conflicting function between two or more user devices that arose based on adjustments to device personas in the group. The server 420 can also adjust portions of a device persona for one or more devices of the group of user devices. For instance, the server 430 can adjust device personas for all of the devices so as to designate preferred devices for exclusive functions or non-exclusive functions while the devices retain the responsibility of adjusting the remaining portion of the device personas, such as for other device behavior, call routing, notification control and so forth. The media processors (e.g., set top box) 406 and wireless communication devices 416 can be provisioned with software function 464 to access various information (e.g., presence information, operational capability information, usage profiles and/or state information), adjust device personas and/or utilize the services of server 430. In one embodiment of system 400, a user can designate one of his or her devices as a master device that retains priority decision making control, such as resolving conflicting functions for the group of devices, designating preferred devices among the group and/or generating device persons for one or more other devices of the group of devices.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
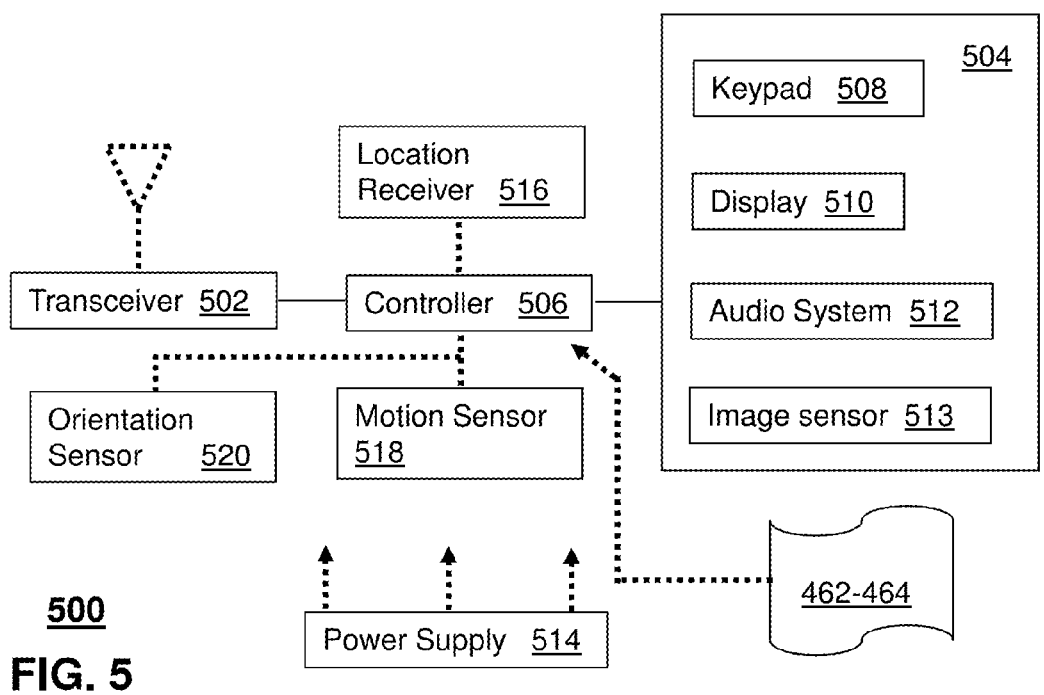
FIG. 5 depicts an illustrative embodiment of a communication device that can adjust its own device persona.

FIG. 5 depicts an illustrative embodiment of a communication device 500. Communication device 500 can serve in whole or in part as an illustrative embodiment of the devices depicted in FIGS. 1-2 and 4. Device 500 can obtain presence information associated with a plurality of communication devices, where the device 500 and the plurality of communication devices are among a group of devices associated with a user. Device 500 can obtain operational capability information for the plurality of communication devices. Device 500 can generate a first usage profile for the communication device based on monitoring first activity at the communication device, where the first activity being monitored includes first media consumption and first communication sessions, and where the monitoring of the first activity includes identifying time and location data for the first activity. Device 500 can obtain other usage profiles for each of the plurality of communication devices, where the other usage profiles are generated by a corresponding one of the plurality of communication devices based on monitoring other activity at the corresponding one of the plurality of communication devices, where the other activity being monitored includes other media consumption and other communication sessions, and where the monitoring of the other activity includes identifying time and location data for the other activity. Device 500 can obtain state information for each of the plurality of communication devices, where the state information includes current power information and active communication session information. Device 500 can adjust a device preference among the group of devices for presenting media services based on the presence information, the operational capability information, the other usage profiles, and the state information.

To enable these device persona adjusting features, communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of the media processor 406, the media devices 408, or the portable communication devices 416 of FIG. 4. It will be appreciated that the communication device 500 can also represent other devices that can operate in communication system 400 of FIG. 4 such as a gaming console and a media player.

The communication device 500 shown in FIG. 5 or portions thereof can serve as a representation of one or more of the devices of systems 100 and/or 200 of FIGS. 1 and/or 2, and/or communication system 400. In addition, the controller 506 can be adapted in various embodiments to perform the functions 462-464.

Upon reviewing the aforementioned embodiments, it would be evident to an artisan with ordinary skill in the art that said embodiments can be modified, reduced, or enhanced without departing from the scope of the claims described below. For example, device person adjustments can be made based on network status information that is received from the network by one or more of the devices of the group of user devices. For example, the mobile device 110 may be designated as the preferred device for receiving incoming calls. The desktop computer 120 may receive network status information that indicates there is a network overload causing call dropping that would effect communication sessions for the mobile device 110. Based on this network status information, the desktop computer 120 and the mobile device 110 can adjust their respective device personas so that the desktop computer becomes the preferred device for receiving incoming communications for the user.

In one embodiment, the group of user devices can utilize a master/slave arrangement where the master device generates and configures all of the device person for the entire group of devices. In another embodiment, the master/slave arrangement can be dynamic such that the particular device functioning as the master device can change based on the circumstances. For example, user preferences and/or user input can designate a particular device as a master device. In another embodiment, presence information, capability information, usage profiles and/or state information can be utilized in determining whether a particular device should be designated as the master device.

In one embodiment, the adjustment of device persona is not limited to end user devices and can include other customer premises equipment associated with the user. For example, a residential gateway can have a device persona which is adjusted based on the presence information, the operational capability information, the usage profiles and/or the state information. For instance, the residential gateway device persona can distribute media content to a set top box without adjusting the content. However, based upon an adjustment to the device persona of the residential gateway, the residential gateway can commence transcoding of the content for distribution to other devices. In this example, the device persona of the residential gateway changed from being a simple router of content to being a controller of the format of content that is being distributed to the other devices. The adjustment of the gateway persona can be based on the various information received, such as receiving state information from the set top box that indicates the set top box is currently utilizing a large amount of resources (e.g., due to a large download) and could use assistance in changing formats of content that it will receive. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
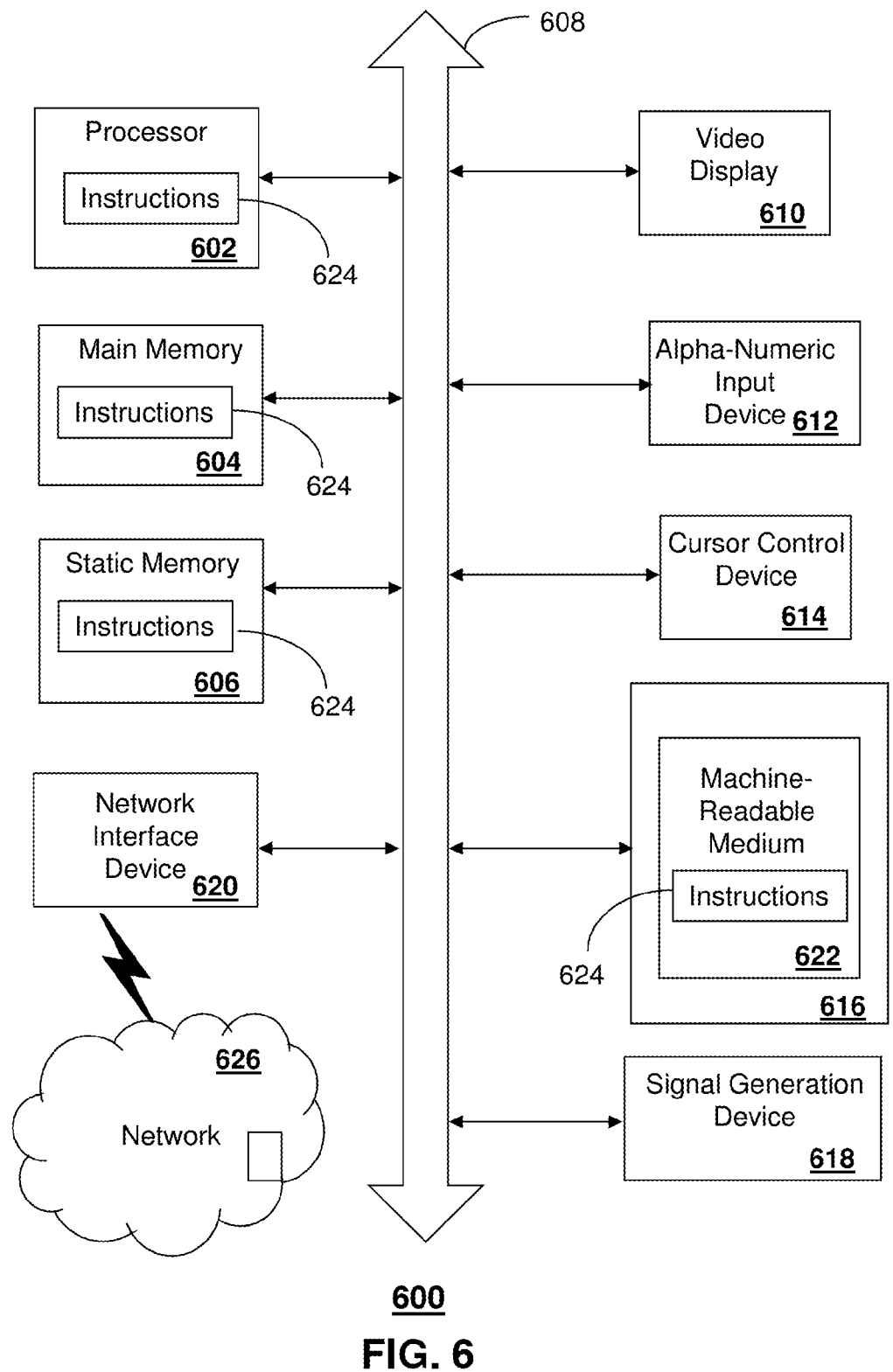
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods describe above. One or more instances of the machine can operate, for example, as the devices 110, 120, the server 430, the media processor 406, the wireless devices 416 and other devices described herein. The machine can perform device persona adjustment based on the various information described herein including presence information, operational capability information, usage profiles and/or state information. The machine can also engage in the sharing or providing of the various information described above. In some embodiments, the machine may be connected (e.g., using a network 626) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display. The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. Additionally, features such as components or steps that are positively recited in one or more of the exemplary embodiments can also be expressly excluded from the exemplary embodiments.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    obtaining, by a first communication device including a processor, presence information associated with a plurality of communication devices, wherein the first communication device and the plurality of communication devices are associated with a user;
    obtaining, by the first communication device, operational capability information for the plurality of communication devices;
    generating, by the first communication device, a first usage profile for the first communication device based on monitoring first activity at the first communication device, wherein the first activity being monitored includes first media consumption and first communication sessions, and wherein the monitoring of the first activity includes identifying time and location data for the first activity;
    obtaining, by the first communication device, other usage profiles for the plurality of communication devices, wherein each respective other usage profile is generated by a corresponding one communication device of the plurality of communication devices based on monitoring other activity at the corresponding one communication device, wherein the other activity being monitored includes other media consumption and other communication sessions, and wherein the monitoring of the other activity includes identifying time and location data for the other activity;
    obtaining, by the first communication device, state information for each of the plurality of communication devices;
    adjusting, by the first communication device, a first device persona of the first communication device based on the presence information, the operational capability information, the other usage profiles, and the state information, wherein the first device persona controls functions performed by the first communication device; and
    transmitting the first usage profile from the first communication device to the plurality of communication devices.

2. The method of claim 1, wherein the operational capability information includes media service capabilities and formatting capabilities, and wherein the state information includes current power information, current storage capacity information, active communication session information and current signal strength.

3. The method of claim 2, wherein the transmitting of the first usage profile to the plurality of communication devices enables each of the plurality of communication devices to adjust a corresponding device persona, wherein each of the corresponding device persona controls functions performed by one of the plurality of communication devices.

4. The method of claim 1, wherein the functions controlled by the first device persona include being selected as a preferred device for presentation of first media services, wherein the plurality of devices is not selected as the preferred device.

5. The method of claim 1, comprising:
    generating, by the first communication device, a second device persona based on the presence information, the operational capability information, the other usage profiles, and the state information, wherein the second device persona controls functions performed by a second communication device of the plurality of communication devices; and
    transmitting the second device persona from the first communication device to the second communication device.

6. The method of claim 5, wherein the functions controlled by the second device persona include being selected as a preferred device for presentation of second media services, wherein the first communication device is not selected as the preferred device.

7. The method of claim 1, wherein the obtaining of the presence information associated with the plurality of communication devices comprises:
    capturing, by the first communication device, an image;
    analyzing, by the first communication device, the image utilizing pattern recognition to identify a second communication device; and
    determining that the second communication device is among the plurality of communication devices associated with the user.

8. The method of claim 1, comprising receiving, by the first communication device, updated state information from a second communication device of the plurality of communication devices, wherein the updated state information is received in response to a forced shutdown at the second communication device.

9. The method of claim 1, comprising:
    identifying, by the first communication device, a conflicting function in the first device persona and in a second device persona of a second communication device of the plurality of communication devices, wherein the second device persona is generated by the second communication device based on the presence information, the operational capability information, the other usage profiles, and the state information; and
    communicating between the first and second communication devices to resolve the conflicting function between the first and second device persona so that one of the first or second communication devices is designated to perform the conflicting function.

10. The method of claim 1, wherein the first device persona and the corresponding device persona collectively provide a prioritized list of preferred devices for providing media services to the user.

11. A communication device comprising:
    a memory to store executable instructions; and a processor coupled with the memory, wherein the processor, responsive to executing the executable instructions, performs operations comprising:
  obtaining other usage profiles for each of a plurality of communication devices, wherein the communication device and the plurality of communication devices are among a group of devices associated with a user, wherein each respective other usage profile is generated by a corresponding one communication device of the plurality of communication devices based on monitoring other activity at the corresponding one communication device, wherein the other activity being monitored includes other media consumption and other communication sessions, and wherein the monitoring of the other activity includes identifying time and location data for the other activity;
  obtaining state information for each of the plurality of communication devices, wherein the state information includes current power information and active communication session information;
  adjusting a device preference among the group of devices for presenting media services based on the other usage profiles and the state information;
  obtaining presence information and operational capability information for the plurality of communication devices;
  generating a device persona based on the presence information, the operational capability information, the other usage profiles, and the state information, wherein the device persona is utilized by a second communication device of the plurality of communication devices to adjust functions performed by the second communication device; and
  transmitting the device persona from the communication device to the second communication device.

12. The communication device of claim 11, wherein the operational capability information includes media service capabilities, wherein the device persona is utilized by the communication device to control functions performed by the communication device.

13. The communication device of claim 11, wherein the operations further comprise:
  generating a first usage profile for the communication device based on monitoring first activity at the communication device, wherein the first activity being monitored includes first media consumption and first communication sessions, and wherein the monitoring of the first activity includes identifying time and location data for the first activity; and
  transmitting the first usage profile from the communication device to a second communication device of the plurality of communication devices to enable the second communication device to adjust a device persona for the second communication device, wherein the device persona controls functions performed by the second communication device.

14. The communication device of claim 11, wherein the operational capability information includes formatting capabilities.

15. The communication device of claim 14, wherein the functions controlled by the device persona include being selected as a preferred device for presentation of second media services, wherein the communication device is not selected as the preferred device.

16. The communication device of claim 11, wherein the state information includes at least one of current storage capacity information, current signal strength, or inactive connections.

17. A non-transitory computer-readable storage device comprising computer instructions which, responsive to being executed by a processor of a first communication device, cause the processor to perform operations comprising:
  obtaining operational capability information and presence information for a plurality of communication devices, wherein the first communication device and the plurality of communication devices are associated with a user, wherein the operational capability information includes media service capabilities and formatting capabilities;
  obtaining usage profiles for the plurality of communication devices, wherein each respective usage profile is generated by a corresponding one communication device of the plurality of communication devices based on monitoring activity at the corresponding one communication device, wherein the activity being monitored includes media consumption and communication sessions;
  adjusting a first device persona of the first communication device based on the operational capability information and the usage profiles, wherein the first device persona controls functions performed by the first communication device, wherein the adjusting of the first device persona of the first communication device is based on the presence information;
  generating a first usage profile for the first communication device based on monitoring activity at the first communication device, wherein the activity being monitored includes media consumption and communication sessions; and
  transmitting the first usage profile from the first communication device to a second communication device of the plurality of communication devices to enable the second communication device to adjust a second device persona for the second communication device, wherein the second device persona controls functions performed by the second communication device.

18. The non-transitory computer-readable storage device of claim 17, wherein the operational capability information includes media service capabilities and formatting capabilities.

19. The non-transitory computer-readable storage device of claim 17, wherein the operations further comprise:
  obtaining state information for each of the plurality of communication devices, wherein the state information includes current power information;
  generating a second device persona based on the operational capability information, the usage profiles, and the state information, wherein the second device persona controls functions performed by a second communication device of the plurality of communication devices; and
  transmitting the second device persona from the first communication device to the second communication device.

20. The non-transitory computer-readable storage device of claim 17, wherein the operations further comprise obtaining state information for each of the plurality of communication devices, wherein the state information includes current power information, wherein the monitoring of the activity includes identifying time and location data for the activity, and wherein the state information includes at least one of active communication session information, current storage capacity information, current signal strength, or inactive connections.

\* \* \* \* \*